US012806625B2

(12) United States Patent
Doppstadt

(10) Patent No.: US 12,806,625 B2
(45) Date of Patent: Nov. 24, 2026

(54) SHREDDING DEVICE FOR SHREDDING MATERIAL TO BE SHREDDED

(71) Applicant: Doppstadt Umwelttechnik GmbH, Velbert (DE)

(72) Inventor: Ferdinand Doppstadt, Velbert (DE)

(73) Assignee: Doppstadt Umwelttechnik GmbH, Velbert (DE)

( * ) Notice: Subject to any disclaimer, the term of this patent is extended or adjusted under 35 U.S.C. 154(b) by 154 days.

(21) Appl. No.: 18/701,502

(22) PCT Filed: Mar. 21, 2023

(86) PCT No.: PCT/EP2023/057143

§ 371 (c)(1),
(2) Date: Apr. 15, 2024

(87) PCT Pub. No.: WO2023/194091

PCT Pub. Date: Oct. 12, 2023

(65) Prior Publication Data

US 2024/0408610 A1 Dec. 12, 2024

(30) Foreign Application Priority Data

Apr. 7, 2022 (DE) ..................... 10 2022 001 197.2

(51) Int. Cl.
*B02C 18/22* (2006.01)
*B02C 13/26* (2006.01)
(Continued)

(52) U.S. Cl.
CPC ...... *B02C 18/2291* (2013.01); *B02C 18/0084* (2013.01); *B02C 18/145* (2013.01)

(58) Field of Classification Search
CPC .... B02C 18/0084; B02C 18/145; B02C 13/26
See application file for complete search history.

(56) References Cited

U.S. PATENT DOCUMENTS 5,462,238 A * 10/1995 Smith ................. B02C 18/2283 241/292.1
5,863,003 A * 1/1999 Smith ................... B02C 18/225 241/73

(Continued)

FOREIGN PATENT DOCUMENTS

EP 3909683 A1 11/2021

OTHER PUBLICATIONS

International Search Report and Written Opinion in PCT/EP2023/057143, dated Aug. 24, 2023 (10 pages) and English Translation (6 pages).

(Continued)

*Primary Examiner* — Mohammed S. Alawadi
(74) *Attorney, Agent, or Firm* — Andrus Intellectual Property Law, LLP

(57) ABSTRACT

A shredding device for use in the field of recycling and waste processing has a shredding roller having a basic roller body rotatable about an axis and a feed means for feeding material to the shredding roller, wherein shredding tools are provided on the basic roller body, which are spaced apart from one another and are arranged in rows extending in the longitudinal direction of the basic roller body and extending obliquely with respect to the longitudinal direction. A larger quantity of material is produced at the first end than at the second end of the basic roller body, wherein directly adjacent shredding tools of a row are arranged such that the shredding tool facing the second end is set back in the direction of rotation relative to the shredding tool facing the first end and/or wherein different distances are provided between directly adjacent shredding tools of a row.

17 Claims, 5 Drawing Sheets

(51) Int. Cl.

| | |
|---|---|
| ***B02C 13/286*** | (2006.01) |
| ***B02C 18/00*** | (2006.01) |
| ***B02C 18/14*** | (2006.01) |
| ***B02C 18/18*** | (2006.01) |
| ***B02C 18/24*** | (2006.01) |
| ***B02C 23/02*** | (2006.01) |

(56) References Cited

U.S. PATENT DOCUMENTS

| | | | | |
|---|---|---|---|---|
| 2001/0045478 | A1* | 11/2001 | Recker | B02C 18/145<br>241/294 |
| 2008/0298909 | A1* | 12/2008 | Gaudreault | B26D 7/2614<br>407/30 |
| 2020/0197947 | A1 | 6/2020 | Verzilli | |

OTHER PUBLICATIONS

International Preliminary Examination Report and Annexes thereto in PCT Application No. PCT/EP2023/057143, dated Dec. 11, 2023.

* cited by examiner

SHREDDING DEVICE FOR SHREDDING MATERIAL TO BE SHREDDED

CROSS-REFERENCE TO RELATED APPLICATIONS

The present application is the U.S. national stage application of international application PCT/EP2023/057143, filed Mar. 21, 2023, which international application was published on Oct. 12, 2023, as International Publication WO 2023/194091 A1. The international application claims priority to German Patent Application No. 10 2022 001 197.2, filed Apr. 7, 2022. The international application and German application are hereby incorporated by reference herein in their entireties.

BACKGROUND

The present invention relates to a shredding device for shredding material to be shredded. The shredding device is used in particular in the field of recycling and/or waste processing. The shredding device can have a shredding roller, which in turn can have a basic roller body. The shredding roller and/or the basic roller body can be mounted to rotate about an axis of rotation. Furthermore, the shredding device also has a feed means for feeding material to be shredded to the shredding roller. The feed means is designed in particular as a feed hopper. Shredding tools, in particular teeth, are provided on the basic roller body, spaced apart from one another and arranged in a plurality of oblique rows extending in the longitudinal direction of the basic roller body at an angle with respect to the longitudinal direction on the basic roller body.

Such devices are already known in the prior art. It is also known to arrange the shredding tools in rows parallel to the axis of rotation and/or the longitudinal direction of the basic roller body. Compared to rows arranged parallel to the axis of rotation of the basic roller body, rows of shredding tools arranged at an angle can result in improved equalization and shredding of the material to be shredded.

The shredding tools can be designed as individual tools and/or as teeth, cutting edges and/or movable beaters. Typically, the shredding device also has a comb with counter tools, which can be mounted in particular on a machine frame and/or a frame of the shredding device. In order to comminute the material to be shredded, the shredding tools can interact with the counter tools of the comb, wherein the counter tools of the comb can be designed in such a way that the material to be shredded is comminuted when the shredding roller turns and/or rotates.

The comb is usually designed as a comb bar for holding the tools and usually extends at least essentially across the entire width of the shredding roller. The comb can be either single-part or multi-part.

A disadvantage of the known shredding device is that even in this case, contiguous, interlocked and/or elongated shredded material can only be shredded insufficiently, if not inadequately, by the shredding device. It is true that the inclined rows of shredding tools enable a certain degree of equalization compared to rows running parallel to the longitudinal direction of the basic roller body. In some cases, however, this equalization is not sufficient to achieve reliable, effective and uniform shredding of particularly entangled shredded material.

SUMMARY

The object of the present invention is to avoid or at least substantially reduce the aforementioned disadvantages.

The aforementioned object is solved by a shredding device described herein.

During the development of the present invention, it was found that during the feeding and/or supply of material to be shredded via the feed means, it is not uncommon for a larger quantity of material to be shredded to be fed at one point and then at another point. In any case, this uneven feeding makes a considerable contribution to the sometimes inadequate shredding that occurs in the prior art. The invention now provides for the feed means to be designed and/or the feeding to be controlled in such a way that a larger quantity of material to be shredded is produced at the first end of the basic roller body than at the second end of the basic roller body. In other words, a larger quantity of shredded material is deliberately fed at a specific point, namely at the first end of the basic roller body.

With the above stipulation of deliberately uneven feeding, three alternative embodiments are now possible.

According to the first alternative according to the invention, in addition to the non-uniform feed, it is provided that immediately adjacent shredding tools of a row are arranged in such a way that the shredding tool facing the second end is set back with respect to the shredding tool facing the first end in the direction of rotation of the shredding roller.

According to the second alternative, in addition to the non-uniform feed, it is provided that different distances are provided between directly adjacent shredding tools in a row. In particular, the distances between directly adjacent shredding tools differ for at least two pairs, preferably at least five pairs, of directly adjacent shredding tools in a row.

In the third alternative according to the invention, both the first and the second alternative are realized in addition to the non-uniform feeding of the material to be shredded.

Moreover, it is understood that in the second alternative according to the invention, at least three shredding tools of a row are arranged in accordance with the arrangement according to the invention in such a way that the row has at least two different distances between immediately adjacent shredding tools. Preferably, however, a plurality of distances between directly adjacent shredding tools of a row are formed differently. Preferably, at least three different distances, preferably between 3 and 20, more preferably 3 to 10, different distances are provided.

The longitudinal direction of the basic roller body is to be understood in particular in such a way that it runs in the direction of the largest longitudinal extension of the basic roller body. In particular, the basic roller body can be cylindrical, preferably hollow cylindrical. The longitudinal direction of the basic roller body can, in particular, run in the direction of and/or parallel to the axis of rotation of the basic roller body and/or coincide with it and/or form the central axis of the basic roller body, which is preferably cylindrical in shape.

The first alternative according to the invention is to be understood in particular in such a way that the shredding tools are arranged to follow in the direction of rotation-namely in relation to the first end of the shredding roller, at which the material feed can take place, and/or in relation to and/or starting from the first end.

In the state of the art, it is generally known that the shredding tools are arranged at an angle on the surface of the basic roller body. However, the inclined arrangement is provided in the opposite direction—i.e. leading the direction of rotation. In the embodiment known in practice, it is provided that, in the case of directly adjacent shredding tools in a row, these are arranged in such a way that the shredding tool facing the first end is set back in the direction of rotation with respect to the shredding tool facing the second end. According to the invention, it has now been established that the handling in the prior art leads to the feed material being compressed more strongly, particularly in the area in which a larger quantity of feed material is fed, which has a lasting adverse effect on the shredding result.

However, the embodiment according to the invention can enable equalization of the material-starting from the first end to the opposite second end of the basic roller body. In this case, the material is equalized after the feed and at least partially transported in the direction of the other end, so that an at least substantially uniform distribution of the material to be shredded can be achieved over the length of the shredding roller, which runs in the longitudinal direction of the shredding roller.

This ensures better and more uniform shredding over the entire length of the roller, at least essentially.

In the second alternative according to the invention, the distance between directly adjacent shredding tools can also be adapted and/or adjusted as a function of different loads on the shredding roller. For example, the distance can be reduced in the areas in which an increased amount of shredded material is to be expected. In accordance with the invention, it is thus possible to design the distances in a row in such a way that improved comminution can be ensured at points with an increased amount of material to be shredded. However, the distances are also adapted in an inclined row, which contributes to improved equalization of the material. It is therefore also understood that it is particularly preferable that both alternatives according to the invention can be combined with each other.

In the state of the art, only equal distances are provided between directly adjacent shredding tools in a row. However, the quantities of material to be shredded are not the same over the length of the basic roller body, so that the equal distances do not take into account the material feed actually carried out in practice.

In accordance with the invention, it has been found that unequal spacing of the shredding tools in individual rows, which can also be referred to as toothed canals, can ensure individual adaptation to different shredding tasks. In particular, the feed behavior of material to be shredded slipping out of the feed means can be improved. Furthermore, the material to be shredded can preferably be equalized to a greater extent due to the different distances. This effect is further enhanced if the first alternative according to the invention is also implemented.

According to the invention, a material jam of shredding material can also be at least essentially avoided, since the shredding can be improved by an optimized arrangement of the shredding tools. The material jam would otherwise lead to so-called bridging in the shredding chamber and have a negative effect on the shredding process.

In particular, the second alternative according to the invention enables the shredding device to be continuously loaded with material to be shredded, as a result of which the throughput of shredded material in particular can be significantly increased compared to the prior art.

The arrangement of the shredding tools in rows is to be understood in particular in such a way that a shredding tool can only be assigned to one row at a time. Thus, in particular, it is excluded according to the invention that a shredding tool is assigned to different rows. The arrangement in a row is also to be understood in such a way that the "imaginary" row in particular connects the centers of the shredding tools with one another. The row preferably extends from the first end to the second end of the basic roller body and runs on the outside of the basic roller body. The row can also be designed in such a way that the imaginary line connecting the center points is, in particular, continuous and/or monotonically increasing. Thus, in particular, no "constant" sections of the row and/or the line connecting the centers of the shredding tools are provided.

Preferably, a plurality of regions is provided on the basic roller body, preferably with essentially the same width. The width of the regions is determined in particular in relation to the length of the basic roller body. This means that the basic roller body can be divided into different regions. A larger number of shredding tools is provided in at least one region than in another region. This can be achieved by preferably reducing the distances between directly adjacent shredding tools in the region with the larger number of shredding tools. Preferably, the region with the higher number of shredding tools is assigned to the first end and/or arranged at the first end of the basic roller body, at which an increased volume of material is produced by feeding via the feed means. The increased number of shredding tools in the relevant region of the basic roller body can thus react to the increased feed quantity of the material to be comminuted and thus ensure efficient comminution.

In particular, at least three regions of substantially equal width are provided on the basic roller body, in particular surrounding the basic roller body circumferentially, the regions differing from one another by a different number of shredding tools. Preferably, a larger number of shredding tools can be provided in a first region facing the first end than in the two other regions. Alternatively or additionally, it may preferably be provided that a larger number of shredding tools is provided in the middle region arranged between the first and the further region facing the second end than in the further region. Thus, the three regions can be divided in such a way that the largest number of shredding tools is preferably present in the first region. In the middle region, there may be a number of shredding tools that is lower than in the first region, but higher than in the further (outer) region. The smallest number of shredding tools can be provided in the further region facing the second end or arranged at the second end. In this context, it is understood that the distances between immediately adjacent shredding tools can be the same or different in each region. Ultimately, however, the distances between immediately adjacent shredding tools of two different regions (i.e. in the connection region between two regions) differ.

In an alternative, but also preferred embodiment, it is provided in particular that at least three regions are present on the basic roller body, in particular surrounding the basic roller body circumferentially, which can in particular each have an equal width in the longitudinal direction of the basic roller body. The first region facing the first end has in particular the highest number of shredding tools or the number of shredding tools in the first region preferably corresponds to the number of shredding tools from the further region arranged at the second end. In particular, the middle region has fewer shredding tools than the first region and/or fewer or the same number of shredding tools than the further region. The further region can preferably have at least two shredding tools, each of which is at a different distance from at least one immediately adjacent shredding tool. Preferably, the density of shredding tools in the further region increases from the outer section of the further region facing the first end towards the second end. Accordingly, a higher number of shredding tools can be arranged in a row in the end section of the further region, which can face the second end, than in the outer section of the further region facing the first end. In particular, the further region can be divided into different sections with preferably different widths, wherein preferably the distances between directly adjacent shredding tools in a row can be greater in the outer section than in the end section. In particular, the outer section can have a width in the longitudinal direction of the basic roller body that exceeds the width of the end section by at least 50%, preferably by at least 100%, in particular by at least double. In the end section, at least two shredding tools can be arranged per row, which can in particular form a tooth pack.

Ultimately, a compacted arrangement of the shredding tools in the end section of the further region can ensure that a material gap is created in a targeted manner during shredding, which in particular leads to further feed material "slipping". Ultimately, the non-shredded material is at least essentially conveyed above the shredding roller from the first to the second end of the shredding roller. To ensure efficient shredding of the material, the material arranged at the second end and/or conveyed towards the second end must be shredded in the area of the second end. Accordingly, material equalization is also advantageous in the area of the second end of the shredding roller. In particular, the aforementioned distribution of the shredding tools in the different regions of the basic roller body contributes to the reduction of material bridges during shredding.

Preferably, the basic roller body has a length of between 0.5 m and 4 m, preferably of 2 m+/−30%. The advantages of the invention become particularly apparent with such lengths of the basic roller body, since in the prior art the basic roller body generally has a length of 3 m, and shorter lengths have been particularly difficult to achieve.

Alternatively or additionally, it is preferable for the basic roller body to have a diameter of between 0.5 m and 1.2 m, preferably 0.6 m+/−35%

According to the invention, however, the material flow fed to the basic roller body can be optimized, in particular by coordinating the different arrangement of the shredding tools. Accordingly, the use of small, compact shredding devices with a short length is also made possible according to the invention.

As a result, part of the invention is characterized by the fact that the feed means is assigned to the first end and an increased volume of material is also present at this first end. This volume of material can now be counteracted by the fact that a higher number of shredding tools is preferably arranged in this region. This is ensured by the different distances between directly adjacent shredding tools in a row according to the invention.

In addition, in a further preferred embodiment, it is provided that in a first region, in particular the first region of the shredding roller described above, immediately adjacent shredding tools of one row are at a smaller distance from one another than immediately adjacent shredding tools of the same row in a further region facing the second end. Preferably, the first region faces the first end and/or adjoins the first end. The aforementioned arrangement relates in particular to at least two pairs of shredding tools in each case, which are arranged on the one hand in the first region and on the other hand in the further region. This embodiment is in particular also possible independently of the previously described multiple regions-since this preferred embodiment relates in particular to at least one row. It has previously been described that the number of shredding tools for different regions on the shredding roller and/or on the basic roller body differ from one another. The preferred embodiment now described relates this to the rows and not to the circumference of the basic roller body. In this context, however, it is understood that both embodiments can preferably be combined with each other.

Preferably, it is provided that immediately adjacent shredding tools of a row in the first region are equally spaced. In this connection, it may also be provided that the outermost shredding tool, which faces another region, may have a different distance from a shredding tool of the other region than the distances in the first region.

Moreover, in a further, particularly preferred embodiment of the present invention, it is provided that the rows are at least substantially the same or different.

The different design of the rows can result in particular if the shredding tools of adjacent rows are arranged offset to one another and/or if the rows have a different number of shredding tools in different regions. In particular, the different design of the rows can lead to a material separation during comminution and to an optimized comminution behavior of the shredding roller.

Alternatively or additionally, it is preferable for the rows to be equally spaced from one another transversely to the longitudinal direction. This results in particular in a symmetrical arrangement of the rows on the basic roller body.

Preferably, a uniform shredding result can also be ensured by the at least substantially identical design of the rows when the basic roller body is rotated. An at least substantially identical design of the rows is also advantageous in that the shredding tools can interact with the counter-shredding tools of a comb, as previously described in the description of the prior art. In this case, the same design is advantageous because the at least substantially identical design of the rows can also ensure a corresponding interaction between the shredding tools and the counter-shredding tools for each row.

Preferably, the rows can be arranged offset to one another, in particular with the same transverse distance, so that preferably the shredding tools of different directly adjacent rows are not arranged directly behind one another, but offset to one another, at least partially in the middle and/or further region. In this context, it is understood that shredding tools of directly adjacent rows can also be arranged directly behind one another (in relation to the direction of rotation and/or transversely to the longitudinal direction of the basic roller body) in the first region and/or at least partially in the middle region.

Furthermore, in another preferred embodiment, a third region is provided between the first region and the further region. The third region may in particular correspond to the middle region described above or represent a further, independent formation. Preferably, at least two directly adjacent shredding tools of a row are arranged in such a way that they are at a smaller distance from one another than directly adjacent shredding tools of the same row in the further region. In particular, the third region has at least two shredding tools per row, which can be described in particular as a tooth pack. Tooth packs of directly adjacent rows can also be arranged offset to one another.

In particular, the third region can also only form part of the middle region described above.

A second region is particularly preferably provided between the first region and the third region. In particular, the middle region can be formed by the second region and the third region. Preferably, it is provided that at least one shredding tool of a row is arranged in the second region, which includes a distance from the immediately adjacent shredding tools of the same row of the first and/or third region which is greater than the distance between immediately adjacent shredding tools of the first and/or third region.

The design of four regions described above makes it possible to ensure effective shredding, especially for basic roller bodies with a shorter length. This means that the first region can ensure improved feed behavior of shredding material and/or material to be shredded slipping out of the feed means.

Particularly preferably, the feed means is designed as a hinged hopper, so that the combination with the first region is particularly effective, since due to the hopper geometry the material to be shredded is set in motion, preferably at least substantially in rotation, and is thus drawn into the first region for comminution at least substantially in the form of a vortex.

Alternatively or additionally, it may be provided that the feed means is designed as a conveyor belt and/or chute and/or may have a conveyor belt, a chute or the like.

The arrangement of the shredding tools according to the invention can provide an increased equalizing effect, which in particular can also prevent the formation of material bridges.

The third region described above has the particular advantage that a higher volume of material is provided in this region compared to the second and/or further region when material is fed via the feed means.

In particular, the third region can be the same size as the second region or larger. In particular, the width of the third region exceeds the width of the second region by at least 20%, preferably at least 30%. As explained above, the second and third regions together can have the same width as the first and/or the further region. The further region may also be referred to as the fourth region. According to the invention, it has been found that an increased volume of material occurs during comminution, particularly in the first and third regions, which can be absorbed by the corresponding denser arrangement and/or narrower arrangement of the shredding tools. The material can therefore also be efficiently shredded in the third region and the material can be equalized. In particular, the material can be shredded compactly at this point.

In a further preferred embodiment, it is provided that the distances between directly adjacent shredding tools of a row in the further region are greater by at least 100%, preferably at least 200%, more preferably between 300% and 1000%, in particular between 400% and 500%, than the distances between directly adjacent shredding tools of the same row in the first and/or third region.

Preferably, the distances between directly adjacent shredding tools of a row in the further region can be at least twice, preferably at least three times, in particular at least four times, greater than the distances between directly adjacent shredding tools of the same row in the first and/or third region.

According to the invention, it has been found that with distances of the aforementioned type, particularly effective comminution can be ensured even when the material to be shredded is particularly entangled with one another.

In addition, a drive device for driving the shredding roller is preferably provided. According to the invention, it is understood that a plurality of drive devices can also be provided. In particular, the drive device is arranged at the first end of the basic roller body and serves to drive the first end of the basic roller body.

In addition, in a further preferred embodiment, a frame is provided for holding and supporting the shredding roller and preferably the drive device. In particular, the frame can be arranged on a base and ultimately serves to mount and support the shredding roller.

It is also preferable if the shredding roller is mounted on both sides and/or at least on one side, in particular at least indirectly on the frame. The mounting on both sides enables a secure arrangement of the shredding roller, even under high loads, which can preferably prevent machine damage.

Furthermore, it is particularly preferred that the first end and the second end are each assigned a wall of the frame for receiving and supporting the respective end. For example, the first end can be assigned a standing wall of the frame, which can be referred to as the motor standing wall. The second end can also be assigned a standing wall, which can be referred to as the rear standing wall. The feed means can in particular be arranged on the motor standing wall and in particular be firmly connected to it.

Preferably, the shredding device has a comb with counter tools and preferably a comb flap pivotably mounted on the machine frame. The interaction between the counter tools and the shredding tools, which are arranged on the basic roller body, results in particular in the behavior of the shredding device for shredding material according to the invention.

In a further preferred embodiment of the invention, the shredding tool extends only over a section of the circumference of the basic roller body, in particular over at least 0.1% to 90%, preferably between 0.5% to 70%, more preferably between 1% to 20%, of the outer circumference of the basic roller body. Accordingly, the shredding tool preferably does not surround the basic roller body, but protrudes from the basic roller body only in a region and/or section relative to the basic roller body. Such a design of the shredding tools can form the shredding tools into teeth. Furthermore, it is possible for the shredding tools to be provided independently of one another and to be arranged on the roller body, so that the arrangements of the shredding tools on the roller body described above in accordance with the invention can be ensured. Ultimately, the shredding tools can be designed individually and adapted to the respective shredding task and/or adapted to the feed material and arranged on the basic roller body.

Preferably, the shredding tool has an outer upper edge surface which is beveled and/or sloping in relation to the support surface arranged on the basic roller body, preferably at least substantially in the shape of an arcuate section, and which is located in particular opposite the support surface. The outer upper edge surface can in particular be designed to slope downwards in such a way that the section of the shredding tool furthest away from the basic roller body is provided facing the cutting direction, which can run in the direction of rotation of the basic roller body, wherein the distance of the outer upper edge surface from the basic roller body preferably decreases monotonically, in particular strictly monotonically, in the opposite direction to the cutting direction as a result of the sloping design of the outer upper edge surface, which is bounded in particular by the side surfaces of the shredding tool. This shape of the shredding tool ensures the least possible wear of the shredding tool and, in particular, enables efficient shredding of the feed material.

Particularly preferably, the shredding tool has an at least essentially triangular shape in cross-section. In this context, it is understood that a triangular shape also means that the side surfaces and/or the side edges of the triangle are preferably at least substantially arcuate in shape. The shortest side of the triangle in particular faces the cutting direction, while the longer sides can in particular be part of the supporting surface arranged on the basic roller body and the outer upper edge surface. In this context, it is understood that an at least essentially triangular cross-sectional shape is also to be understood as such a shape which can have at least one recess, in particular for the arrangement of connecting means, in particular on the outer upper edge surface. The shredding tools designed in this way can in particular be compact and, in particular, hit the material to be shredded first with the crowned section.

Preferably, the shredding tools are designed in at least two parts. They can have a tooth body provided on the outer casing of the shredding roller and/or the basic roller body and a blade connected to the tooth body in a form-fit and/or force-fit manner. The advantage of the two-part design is that the blade can be easily replaced, in particular due to the wear that occurs, especially without having to replace the entire shredding tool. The blades can be replaceable and/or detachably connected to the tooth body. The tooth body can be firmly arranged on the basic roller body, in particular connected to the basic roller body in a force-fit and/or material-fit manner, preferably welded.

In particular, the shredding tool and/or the tooth body can be attached to the basic roller body. The blade can face the cutting direction. In particular, the blade and the tooth body can be detachably connected and/or fastened to each other via connecting means. This means that if the blade is worn, it can be easily replaced-namely the blade and not necessarily the entire shredding tool. The blade can therefore be designed as a wear part.

Preferably, the blade is supported on the tooth body, which can therefore be designed as a support body. At least one positive connection, preferably at least two positive connections, can be provided to connect the blade to the tooth body. In particular, at least one positive connection can be formed by a tongue and groove connection.

Furthermore, the aforementioned invention also relates to a shredding roller which can be used in particular in a shredding device of the aforementioned type. The shredding roller is provided for comminuting material to be shredded. The shredding roller can have a basic roller body that can rotate about an axis of rotation. Shredding tools, in particular teeth, are preferably arranged on the basic roller body at a distance from one another and in a plurality of rows extending in the longitudinal direction of the basic roller body and extending obliquely with respect to the longitudinal direction of the basic roller body. According to the invention, it is provided that different distances are provided between directly adjacent shredding tools of a row.

The shredding roller according to the invention also enables the advantages previously discussed in connection with the shredding device according to the invention. In order to avoid unnecessary repetitions or explanations, reference may therefore be made to the aforementioned claim, which also applies in the same way to the shredding roller. In particular, reference may be made to the fact that preferred embodiments of the shredding device discussed above can also be transferred to the shredding roller according to the invention, without this requiring further explicit explanation.

Furthermore, it is expressly pointed out that all the aforementioned and following intervals contain all the intermediate intervals and also individual values contained therein and that these intermediate intervals and individual values are to be regarded as essential to the invention, even if these intermediate intervals or individual values are not specifically stated in detail.

Further features, advantages and possible applications of the present invention are apparent from the following description of embodiments based on the drawing and the drawing itself. All the features described and/or illustrated form the object of the present invention, either individually or in any combination, irrespective of their summary in the claims or their relationship to one another.

DETAILED DESCRIPTION

Figure 1:
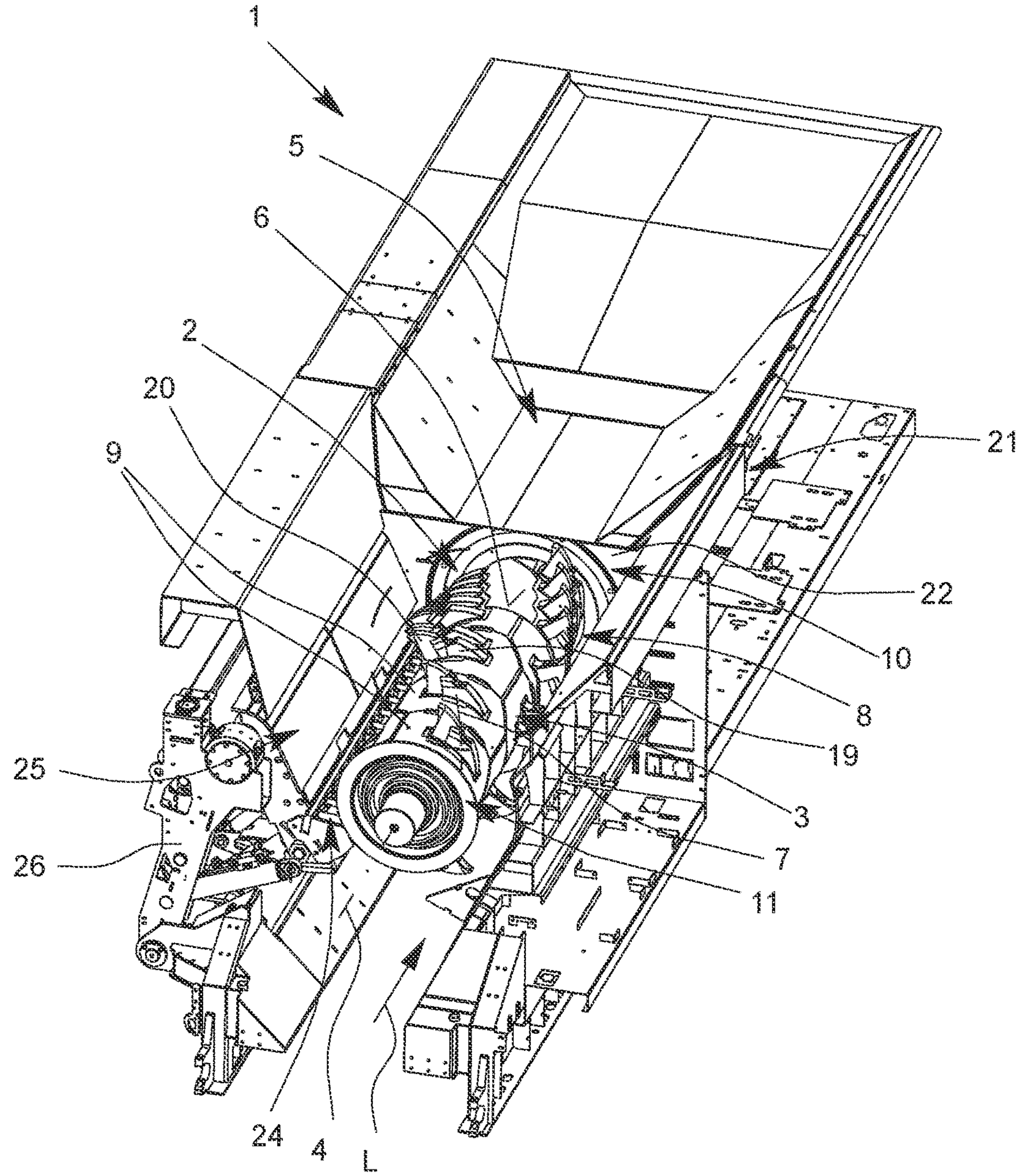
FIG. 1 is a schematic perspective view of a shredding device according to the invention.
Figure 2:
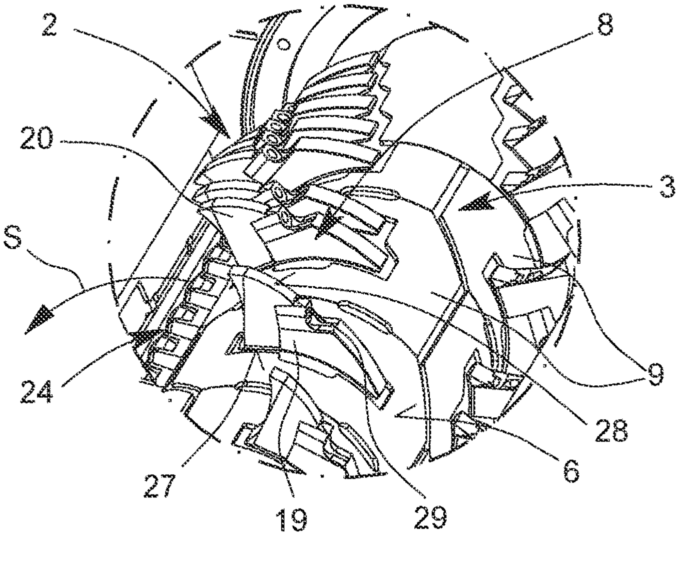
FIG. 2 is a schematic perspective view of detail A from FIG. 1.
Figure 3:
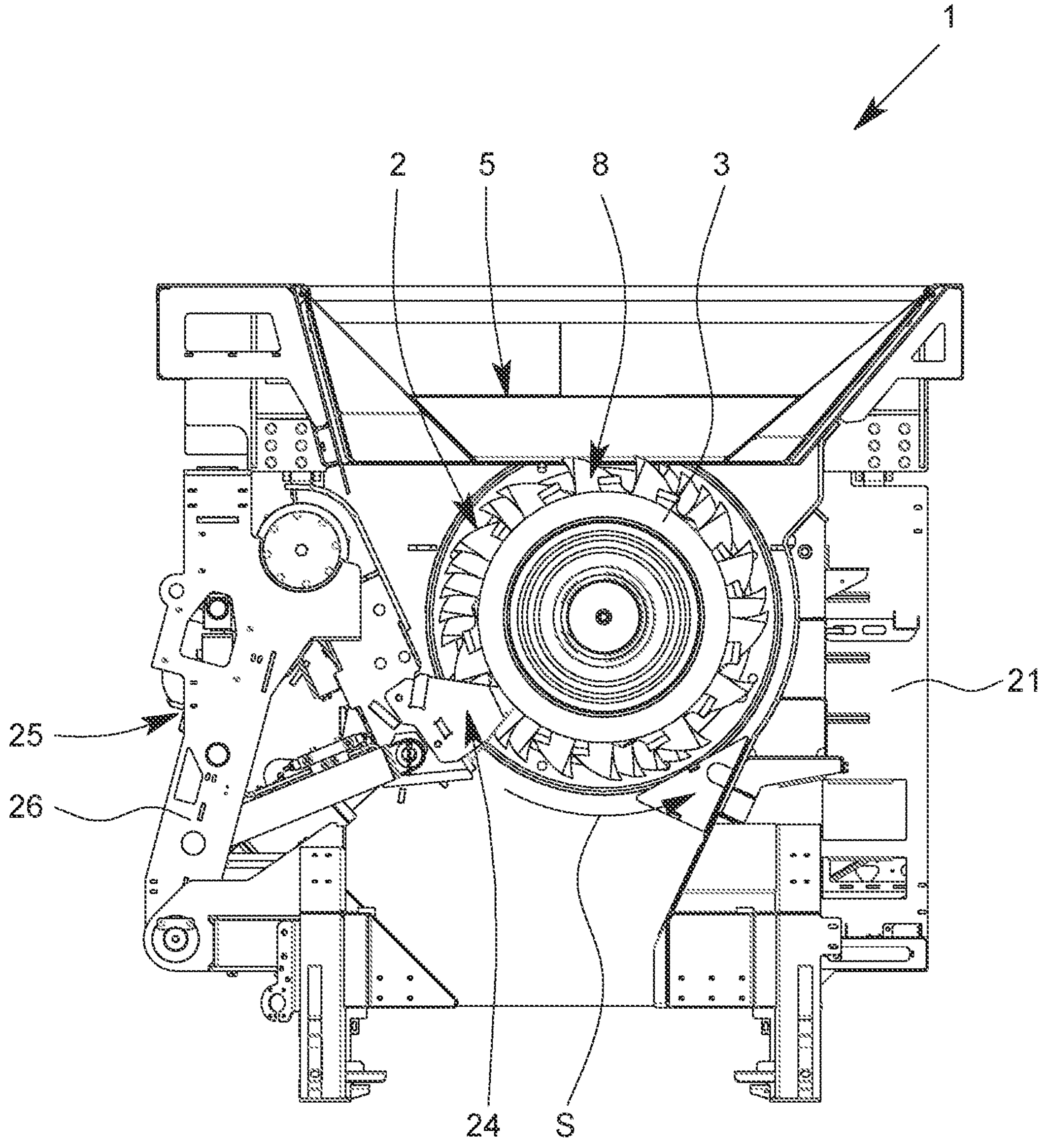
FIG. 3 is a schematic side view of the shredding device shown in FIG. 1.

FIG. 1 shows a shredding device 1 for shredding material that is not shown in detail. The material to be shredded can be a variety of feed material that arises in the field of recycling or waste processing. The shredding device 1 has a shredding roller 2. Different embodiments of shredding rollers 2 according to the invention are shown in FIGS. 4 to 8.

The shredding roller 2 has a basic roller body 3. Both the shredding roller 2 and the basic roller body 3 are rotatable about their respective axis of rotation 4, which in particular coincide. In the embodiment example shown in FIG. 1, it is provided that the shredding device 1 has exactly one shredding roller 2. In further embodiments, several shredding rollers 2 may also be provided, but these are not shown in more detail here.

Furthermore, FIG. 1 shows that the shredding device 1 has a feed means 5. In the illustrated embodiment example, the feed means 5 is designed as a feed hopper and/or funnel-shaped. The feed means 5 ultimately serves to support the feeding of the material to be shredded to the shredding roller 2.

FIG. 1 also shows that shredding tools 8 are provided on the outer side 6 of the basic roller body 3, spaced apart from one another and arranged in several rows 7 extending at an angle to the longitudinal direction L of the basic roller body 3. The shredding roller 2 shown in FIG. 7 has only rows 7 that have shredding tools 8. Each shredding tool 8 is assigned to exactly one row 7. In addition, the rows 7 are identical to each other and, in particular, are symmetrically aligned and/or arranged around the basic roller body 3.

The shredding tools 8 can be designed as teeth.

Figure 5:
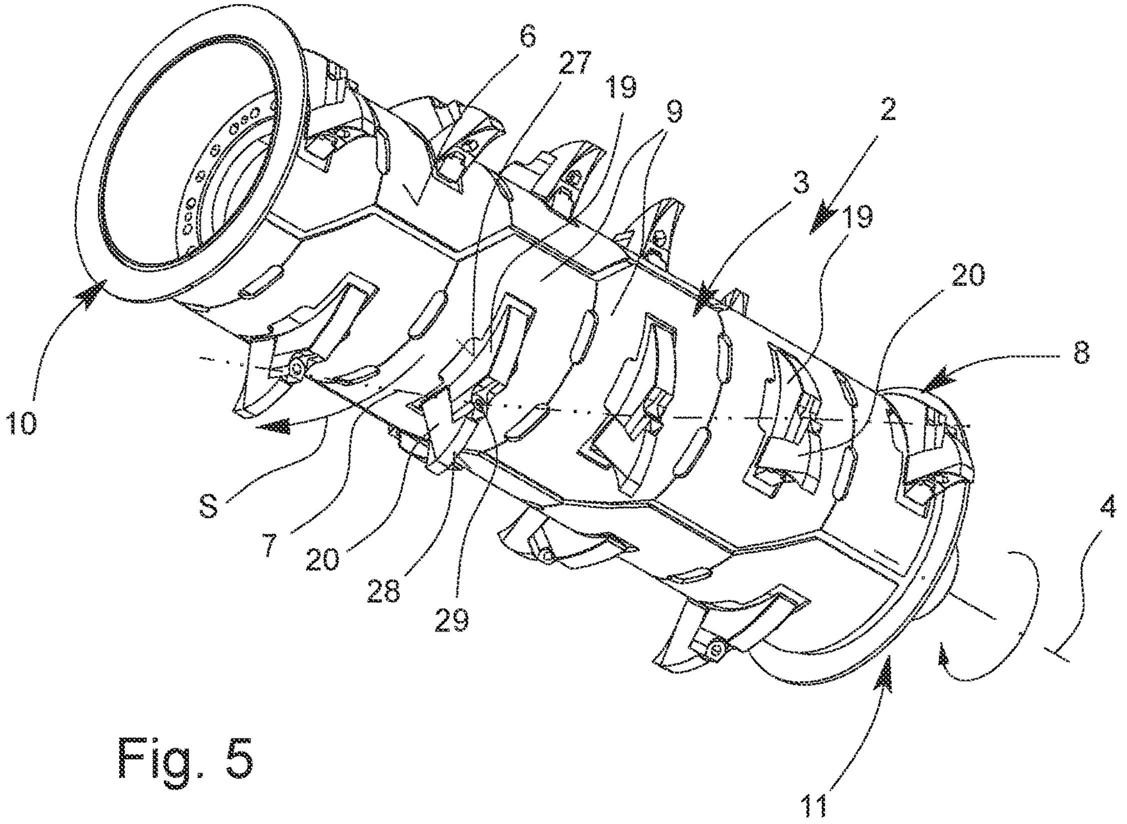
FIG. 5 is a schematic perspective view of the shredding roller shown in FIG. 4.

In addition, the shredding tools 8 can be connected to the basic roller body 3 and/or the outer side 6 in a form-fit or material-fit manner. FIG. 5 shows that the shredding tools 8 are each surrounded by a protective element 9. A protective element 9 can be designed as wear protection for the basic roller body 3 and in particular be connected to the basic roller body 3 with a material bond, in particular by means of welding. Preferably, the protective elements 9 are designed as wear protection plates. The protective elements 9 can have recesses for the arrangement of the shredding tools 8.

A plurality of shredding tools 8 can be arranged in a protective element 9.

FIG. 1 shows that the feed means 5 is designed in such a way that a larger quantity of material to be shredded is produced at the first end 10 of the basic roller body 3 than at the second end 11 of the basic roller body 3. It is understood that the ends 10, 11 refer in particular to the respective end faces of the basic roller body 3. The longitudinal direction L of the basic roller body 3 extends in the direction of the largest longitudinal extension of the basic roller body 3 and, in particular, is also aligned in the direction of the axis of rotation 4 of the basic roller body 3.

The first and second ends 10, 11 are opposite each other in relation to the longitudinal direction L. In particular, the shredding roller 2 can be mounted at both the first end 10 and the second end 11.

FIG. 1 schematically shows the first end 10 of the shredding roller 2, in particular the end mounted on bearings. The feeding of the material to be shredded is not shown in more detail. However, it can be seen from FIG. 1 that during operation of the shredding device 1, more material to be shredded is produced for shredding at the first end 10, which faces and is associated with the feed means 5, than at the opposite second end 11. In particular, the loading with the shredded material does not occur uniformly over the entire length of the shredding roller 2, but is increased at the first end 10 and/or leads to a higher volume of material there.

Figure 4:
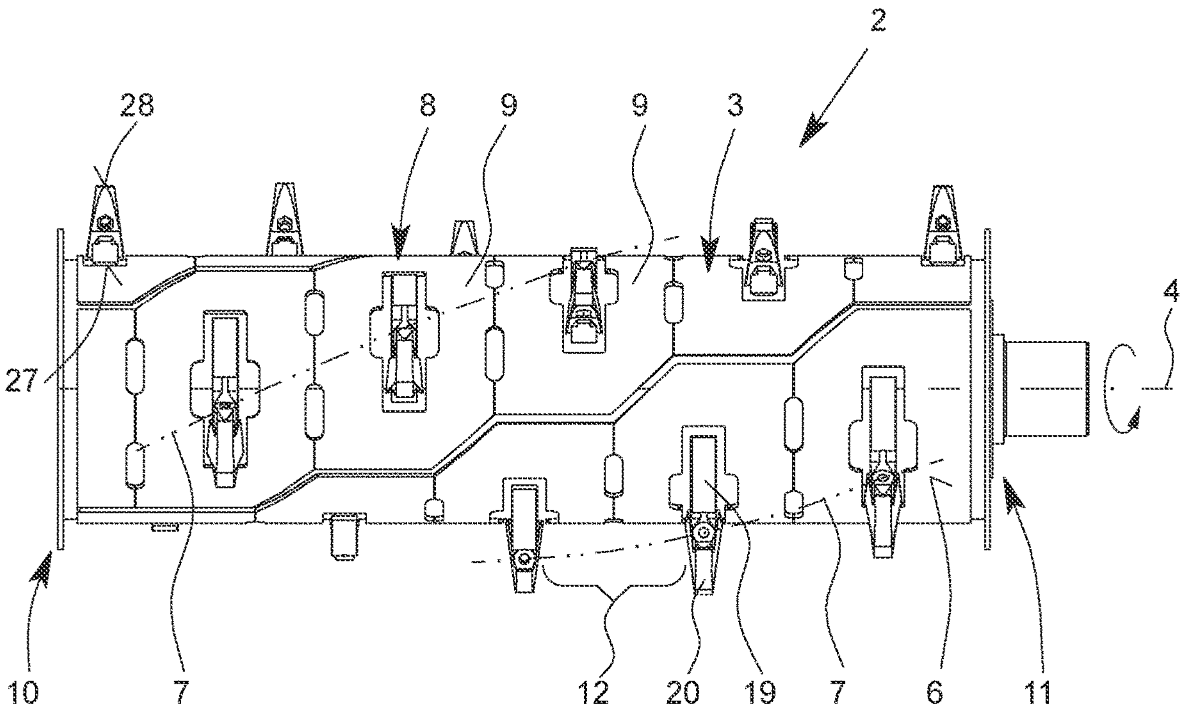
FIG. 4 is a schematic side view of a shredding roller according to the invention.

FIGS. 4 and 5 show a shape of the shredding roller 2 which can also be used in a device 1 as shown in FIG. 1—however, the shape of the shredding roller 2 differs from the shape shown in FIG. 1. What both embodiments have in common, however, is that immediately adjacent shredding tools 8 of a row 7 are arranged in such a way that the shredding tool 8 facing the second end 11 is set back relative to the shredding tool 8 facing the first end 10 in the direction of rotation, which is shown schematically in FIG. 4 by an arrow. The direction of rotation results during operation of the shredding device 1. The corresponding offset back also results in a trailing arrangement of the shredding tools 8 in relation to the direction of rotation. This is also shown schematically in FIG. 6 and in FIGS. 7 and 8.

In the embodiments shown in FIGS. 4 and 5, it is provided that the distances 12 between immediately adjacent shredding tools 8 of a row 7 are at least essentially constant.

In addition, in the embodiment shown in FIGS. 4 and 5, it is provided that the rows 7 are at least substantially identical and preferably have a constant spacing from one another in the transverse direction. However, the rows 7 can be arranged offset to one another. Accordingly, it may be provided that no shredding tool 8 of the further row 7 directly adjacent to the first row is arranged directly behind (in relation to the direction of rotation) a shredding tool 8 of a first row 7. In the embodiment example shown in FIG. 4, the offset of the shredding tools 8 of immediately adjacent rows 7 is approximately 360° divided by the number n of rows 7. Such an offset can also be particularly advantageous with regard to the shredding result in the case of differently formed rows 7.

Figure 7:
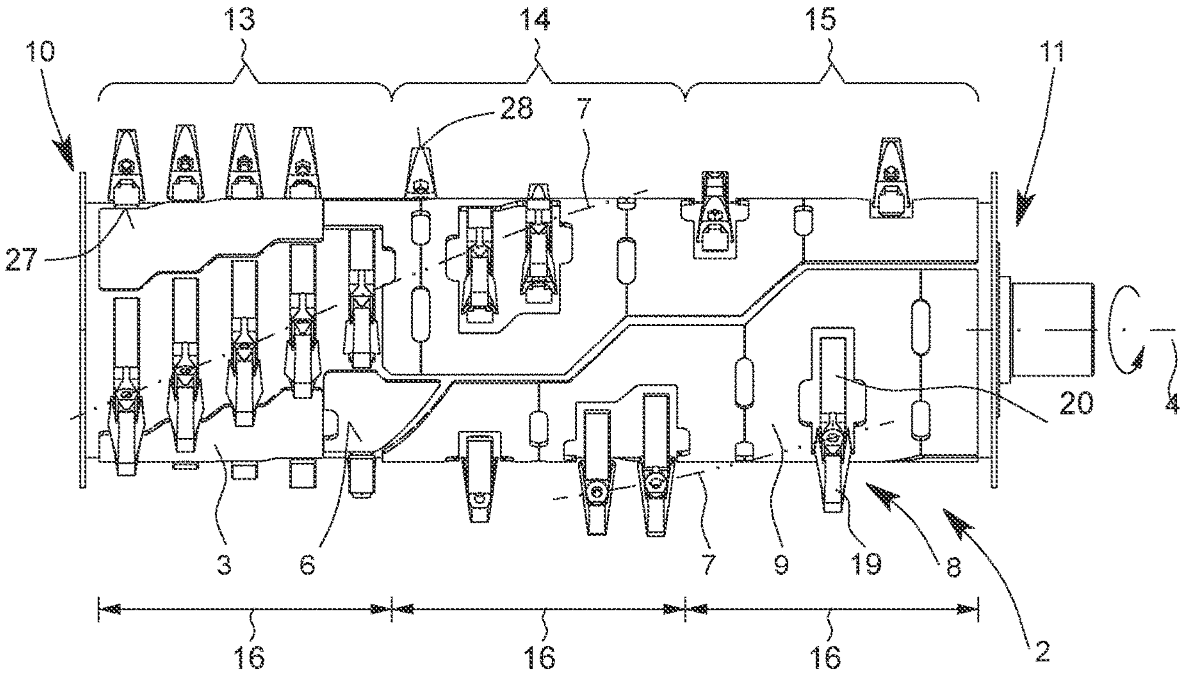
FIG. 7 is a schematic side view of a further embodiment of a shredding roller according to the invention.
Figure 8:
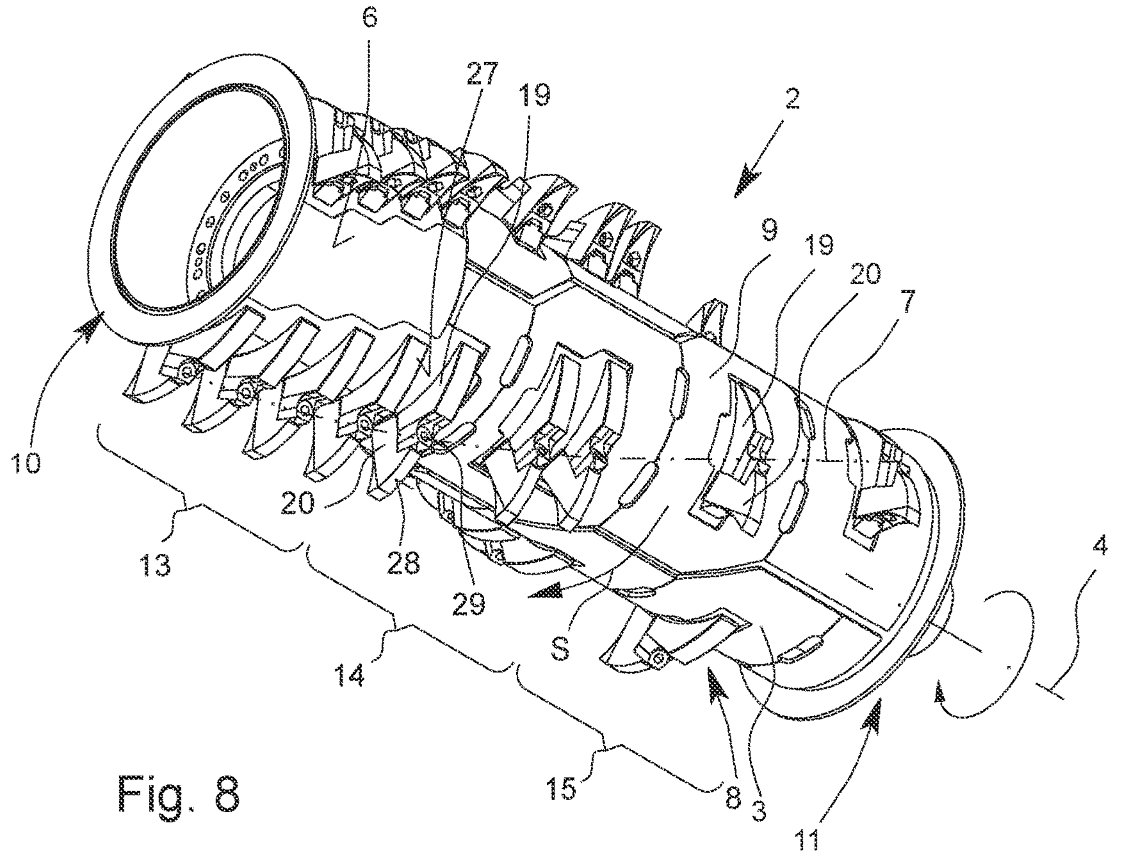
FIG. 8 is a schematic perspective view of the shredding roller shown in FIG. 7.

In the preferred embodiment shown in FIGS. 7 and 8, it is provided that different distances 12 are provided between directly adjacent shredding tools 8 of a row 7. In the case of the different distances 12, it is provided that a plurality of equal distances 12 are also provided in a row 7. However, at least two pairs of shredding tools 8 of a row 7 are arranged in such a way that their distances 12 differ from one another.

In the embodiment shown in FIG. 7, both a corresponding reverse offset with regard to the direction of rotation, as described above, and the realization of different distances 12 are implemented.

Preferably, the aforementioned arrangement of the shredding tools 8 applies to each row 7, wherein a shredding tool 8 can be assigned to exactly one row 7—and not to several rows 7.

FIG. 5 shows that each row 7 is designed as a linear straight line-namely in the corresponding 2D projection—i.e. ultimately with corresponding unwinding from the drum. In particular, row 7 rises at least essentially strictly monotonously in relation to the longitudinal direction L.

Figure 6:
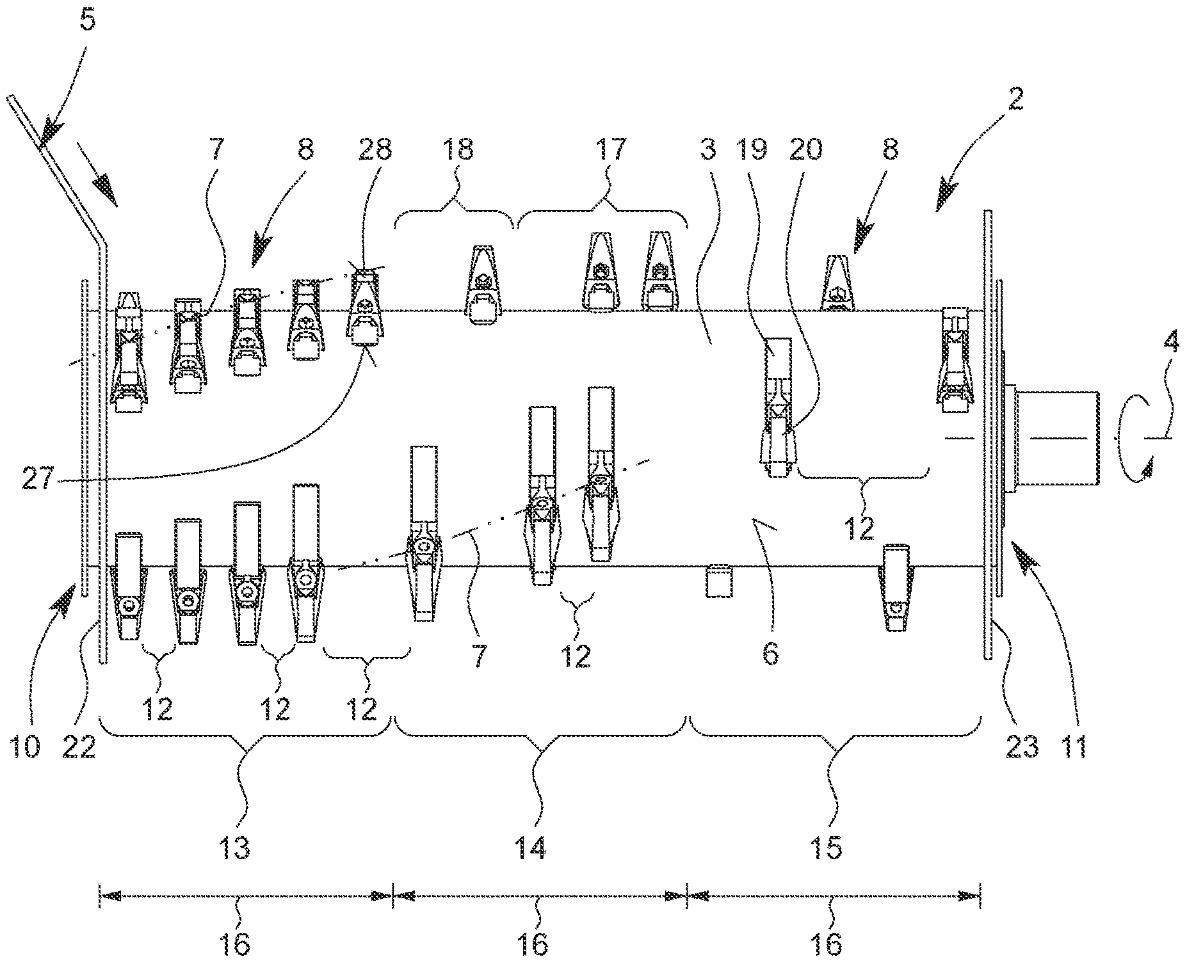
FIG. 6 is a schematic side view of a further embodiment of a shredding roller according to the invention.

FIG. 6 shows that a plurality of regions 13, 14 and 15 are provided on the basic roller body 3. The regions 13 to 15 extend over the entire circumference of the basic roller body 3. FIG. 6 shows that a larger number of shredding tools 8 are provided in the first region 13 than in another region, namely both in the middle region 14 and in the further region 15. The further region 15 can be arranged in particular at the second end 11.

In addition, the regions 13, 14 and 15 are provided with the same width 16 in relation to the longitudinal direction L in the embodiment example shown in FIG. 6. The regions 13, 14 and 15 differ from one another in the different number of shredding tools 8. A larger number of shredding tools 8 can be provided at the first region 13 facing the first end 10 than in the two further regions 14, 15, wherein a larger number of shredding tools 8 is provided in the first region 13 and between the further middle region 14 arranged facing the second end 11 than in the further region 15.

In addition, FIGS. 7 and 8 show that in the first region 13, which faces the first end 10 and/or adjoins the first end 10, immediately adjacent shredding tools 8 of a row 7 have a smaller distance 12 from one another than immediately adjacent shredding tools 8 of the same row 7 in a further region 15. It is understood that the distances 12 in the first region 13 can be at least substantially constant between immediately adjacent shredding tools 8.

In addition, FIG. 6 shows that different rows 7 in the first region 13 can have a different number of shredding tools 8 with an at least substantially constant distance 12 from one another, although the distance between the outermost shredding tool 8 facing the second end 11 and the immediately adjacent shredding tool 8 of the adjoining middle region 14 is at least substantially the same for both rows 7.

In an embodiment not shown, it is provided that at least three regions 13, 14 and 15 are present on the basic roller body 3, which surround the basic roller body 3 circumferentially and can each have an equal width 16 in the longitudinal direction L of the basic roller body 3. The first region 13 facing the first end 10 has the highest number of shredding tools 8 or the number of shredding tools 8 in the first region 13 preferably corresponds to the number of shredding tools 8 from the further region 15 arranged at the second end 11. The middle region 14 has fewer shredding tools 8 than the first region 13 and/or fewer or the same number of shredding tools 8 than the further region 15. The further region 15 can have shredding tools 8 which are at a different distance 12 from the respective immediately adjacent shredding tool 8 of the same row 7. Preferably, the density of shredding tools 8 in the further region 15 increases from the outer section of the further region 15 facing the first end 10 to the second end 11. Accordingly, a higher number of shredding tools 8 can be arranged in a row 7 in the end section of the further region 15, which can face the second end 11, than in the outer section of the further region 15 facing the first end 10. The widths of the outer section and the end section can differ from one another, in particular wherein the outer section in particular has a width in the longitudinal direction L of the basic roller body 3 which exceeds the width of the end section by at least 100%. In addition, the distances 12 between directly adjacent shredding tools 8 of a row 7 can be greater in the outer section than in the end section. In particular, at least two shredding tools 8 can be arranged in the end section for each row 7, which can in particular form a tooth pack.

In the embodiment example shown in FIG. 6, the rows 7 are at least substantially equally spaced from one another transversely to the longitudinal direction L.

In addition, FIG. 6 shows that the middle region 14 can have a third region 17. In the third region 17, at least two directly adjacent shredding tools 8 of a row 7 can have a smaller distance 12 from each other than directly adjacent shredding tools 8 of the same row 7 in the further region 15. In particular, at least two shredding tools 8 can be arranged in the third region 17 for each row 7 and thus ultimately form tooth packs.

In addition, FIG. 6 shows that tooth packs, which are arranged one after the other in relation to the direction of rotation, of different rows 7 are arranged offset to one another-namely in relation to the longitudinal direction L. Here, too, it can be provided in each case that the outer shredding tool 8 of the third region 17 facing the further region 15 is in each case at an equal distance from the immediately adjacent shredding tool 8 of the further region 15 in each row 7. If the shredding tools 8 in the further region 15 are then spaced at least substantially equally apart, this results in a different spacing of the outermost shredding tool 8 facing the second end 11 from the end face of the second end 11 for different rows 7.

FIG. 6 shows that the distances 12 between directly adjacent shredding tools 8 of a row 7 in the further region 15 are at least twice, in particular between four and six times, greater than the distances 12 between directly adjacent shredding tools 8 of the same row 7 in the first region 13 and/or in the third region 17.

FIG. 6 also shows that the middle region 14 has a second region 18. The second region 18 can be arranged between the third region 17 and the first region 13. The second region 18 can have a smaller width than the third region 17. In particular, the width in relation to the longitudinal direction L of the second region is at least 30%, in particular at least 50%, smaller than the width of the third region 17. Furthermore, FIG. 6 shows that the shredding tools 8 of a row 7 arranged in the second region 18 are arranged in such a way that one shredding tool 8 per row 7 is arranged in the second region 18. In this case, the distance 12 between the shredding tool 8 arranged in the second region 18 and the immediately adjacent shredding tool 8 of the same row 7 of the first and/or third region 13, 17 is greater than the distance 12 between immediately adjacent shredding tools 8 of the first region 13 and/or the third region 17.

FIG. 6 further shows that the rows 7 can be arranged offset to one another. The offset can lead, in particular in the middle region 14, to the fact that in the middle region 14, at least partially directly behind a shredding tool 8 of a first row 7, no further shredding tool 8 of the adjacent row 7 is arranged. According to the embodiment example shown in FIG. 6, this applies to all shredding tools 8 of the further region 15 and/or the second region 18 and partially to the third region 17.

In principle, further embodiments may also provide for the rows 7 to be of identical design.

FIG. 5 shows schematically that the shredding tool 8 is formed in at least two parts. The shredding tool 8 can be positively and/or non-positively connected to the outer side 6 and/or the outer shell of the shredding roller 2. In particular, the shredding tool 8 has a toothed body 19, which is arranged directly on the outer side 8 of the basic roller body 3. In addition, the shredding tool 8 can have a blade 20 that can be connected to the toothed body 19 in a force-fit and/or form-fit manner. The knife 20 faces the direction of rotation, so that this component of the shredding tool 8 initially and/or "first" hits the material to be shredded during shredding.

The blade 20 can be connected to the tooth body 19 via at least one positive connection, in particular wherein at least one positive connection can be designed as a tongue and groove connection. Alternatively or additionally, connecting means 29 can be provided for connecting the blade 20 to the tooth body 19, which connect the blade 20 to the tooth body 19, in particular in a force-locking manner.

FIG. 1 shows that a frame 21 is provided for holding and supporting the shredding roller 2. It is not shown in detail that the frame 21 can also serve to support a drive device for driving the shredding roller 2.

FIG. 6 shows schematically that the first end and the second end 10, 11 are each assigned a wall 22 and 23. The wall 22 facing the first end 10 can also be referred to as the motor (standing) wall, since the drive device in particular can be assigned to the first end 10. The wall 23 associated with the second end 11 can also be referred to as the rear (standing) wall.

In addition, FIG. 1 shows that the shredding device 1 has a comb 25 with counter tools 24. The comb 25 can be mounted on the frame 21, which can also be referred to as the machine frame. In addition, the comb 25 can also have a comb flap 26, which is pivotably arranged on the frame 21.

To comminute the material to be shredded, the shredding tools 8 can interact with the counter tools 24. In particular, gaps are provided between directly adjacent counter tools 24, which are formed corresponding to the shape of the shredding tool 8 passing through the respective gap.

FIG. 5 shows that the shredding tool 8 and/or the (all) shredding tools 8 extend only over a section of the circumference of the basic roller body 3, in particular over at least 0.1% to 90%, preferably between 1% to 20%, of the outer circumference of the basic roller body 3. In this way, several shredding tools 8 can be provided independently of one another, distributed over the outer surface of the basic roller body 3.

FIG. 5 also clearly shows that in the illustrated and preferred embodiment example, the shredding tool 8 has an outer upper edge surface 28 which is beveled and/or sloping, preferably at least substantially in the shape of an arcuate section, in relation to the supporting surface 27 arranged on the basic roller body 3, and which in particular lies opposite the supporting surface 27. The sloping outer upper edge surface 28 can in particular be of monotonously falling design and serve to reduce the distance between the outer upper edge surface 28 and the basic roller body 3 in the opposite direction to the cutting direction S. Accordingly, the region of the shredding tool 8 that takes up the most volume of the shredding tool 8 hits the feed material first.

FIG. 8 shows that the shredding tool 8 has an at least substantially triangular shape in cross-section, preferably with at least substantially arcuate edges. A triangular shape is also understood to mean that the outer upper edge surface

28 has a recess, in particular for the arrangement of the connecting means 29, as shown in FIG. 8.

As explained above, the feed means 5 can be designed as a hopper, in particular a hinged hopper. Alternatively or additionally, the feed means 5 can be designed as a conveyor belt and/or chute.

LIST OF REFERENCE SIGNS

1 Shredding device
2 Shredding roller
3 Basic roller body
4 Axis of rotation
5 Feed means
6 Outer side of 3
7 Row
8 Shredding tool
9 Protective element
10 First end
11 Second end
12 Distance
13 First region
14 Middle region
15 Further region
16 Width
17 Third region
18 Second region
19 Tooth body
20 Blade
21 Frame
22 Wall
23 Wall
24 Counter tool
25 Comb
26 Comb flap
27 Supporting surface
28 Outer upper edge surface
29 Connecting means
L Longitudinal direction
S Cutting direction

The invention claimed is:

1. A shredding device for shredding material to be shredded, for use in recycling and waste processing, the shredding device comprising:

at least one shredding roller, wherein the shredding roller is configured to be rotated about an axis of rotation and has a basic roller body;

a feed means for feeding the material to be shredded to the shredding roller; and a plurality of shredding tools provided on the basic roller body, wherein shredding tools in the plurality of shredding tools are spaced apart from one another and arranged in a plurality of rows extending in and obliquely with respect to a longitudinal direction of the basic roller body;

wherein the feed means is designed in such a way that a larger quantity of the material to be shredded is produced at a first end of the basic roller body than at a second end of the basic roller body;

wherein different distances are provided between directly adjacent shredding tools of the plurality of shredding tools that are arranged in a given row of the plurality of rows;

wherein a plurality of regions of a same width are provided on the basic roller body, wherein a larger number of the shredding tools in the plurality of shredding tools is provided in at least one region than in another region of the plurality of regions; and wherein at least three regions of the plurality of regions of the same width are provided on the basic roller body, the at least three regions comprising a first region facing the first end of the basic roller body, a further region facing the second end of the basic roller body, and a middle region arranged between the first region and the further region;

wherein each of the at least three regions has a different number of the shredding tools;

wherein a larger number of the shredding tools in the plurality of shredding tools is provided in the first region than in the middle and further regions; and wherein a larger number of the shredding tools in the plurality of shredding tools is provided in the middle region than in the further region.

2. The shredding device according to claim 1, wherein in the first region of the at least three regions, the directly adjacent shredding tools of the given row are at a smaller distance from one another than the directly adjacent shredding tools of the same given row in the further region.

3. The shredding device according to claim 1, wherein the directly adjacent shredding tools of the given row are equally spaced apart in the first region.

4. The shredding device according to claim 1, wherein the rows in the plurality of rows are of a same design and/or wherein the rows in the plurality of rows are equally spaced from one another transversely to the longitudinal direction.

5. The shredding device according to claim 1, wherein a third region of the at least three regions is provided between the first region and the further region, in which third region at least two of the directly adjacent shredding tools of the given row are at a smaller distance from one another than the directly adjacent shredding tools of the same given row in the further region.

6. The shredding device according to claim 5, wherein a second region of the at least three regions is present between the first region and the third region, at least one shredding tool of the given row being arranged in the second region, wherein the at least one shredding tool of the given row in the second region is arranged at a distance from the directly adjacent shredding tools of the same given row in the first and/or third region that is greater than a distance between the directly adjacent shredding tools of the same given row within the first and/or third region.

7. The shredding device according to claim 5, wherein distances between directly adjacent shredding tools of the given row in the further region are greater than distances between directly adjacent shredding tools of the same given row in the first and/or third region by at least a factor of two.

8. The shredding device according to claim 1, wherein the shredding tools in the plurality of shredding tools are designed in at least two parts and have a tooth body provided on an outer casing of the shredding roller and a blade configured to be connected to the tooth body in a form-fitting and/or force-fitting manner, and wherein the blade and the tooth body are releasably connectable and/or fastenable to one another via connecting means.

9. The shredding device according to claim 1, wherein a frame is provided for holding and mounting the shredding roller and a drive device for driving the shredding roller.

10. The shredding device according to claim 9, wherein the shredding roller is mounted on both sides and/or at least on one side at the first and/or second end of the basic roller body.

11. The shredding device according to claim 10, wherein the first end and the second end of the basic roller body are each assigned a wall of the frame for receiving and supporting the respective first or second end of the basic roller body.

12. The shredding device according to claim 9, wherein the shredding device has a comb having counter tools and a comb flap pivotably mounted on the frame.

13. The shredding device according to claim 1, wherein the shredding tools in the plurality of shredding tools extend only over a section of an outer circumference of the basic roller body and over at least 0.1% to 90% of the outer circumference of the basic roller body.

14. The shredding device according to claim 1, wherein at least one shredding tool of the plurality of shredding tools has an outer upper edge surface, the outer upper edge surface being beveled and/or sloping in relation to a supporting surface arranged on the basic roller body, and the outer upper edge surface being located opposite the supporting surface, and/or wherein the at least one shredding tool has an at least substantially triangular shape in cross-section.

15. The shredding device according to claim 1, wherein the feed means is designed as a hopper, a conveyor belt and/or a chute.

16. The shredding device according to claim 1, wherein the directly adjacent shredding tools of the given row are arranged in such a way that a shredding tool facing the second end of the basic roller body is set back in a direction of rotation relative to a shredding tool facing the first end of the basic roller body.

17. A shredding roller for a shredding device for shredding material to be shredded, for use in recycling and waste processing, the shredding roller comprising:

a basic roller body rotatable about an axis of rotation; and a plurality of shredding tools arranged on the basic roller body at a distance from one another, shredding tools in the plurality of shredding tools being arranged in a plurality of rows extending in and obliquely with respect to a longitudinal direction of the basic roller body;

wherein different distances are provided between directly adjacent shredding tools of the plurality of shredding tools that are arranged in a given row of the plurality of rows;

wherein a plurality of regions of a same width are provided on the basic roller body, wherein a larger number of the shredding tools in the plurality of shredding tools is provided in at least one region than in another region of the plurality of regions; and wherein at least three regions of the plurality of regions of the same width are provided on the basic roller body, the at least three regions comprising a first region facing a first end of the basic roller body, a further region facing a second end of the basic roller body, and a middle region arranged between the first region and the further region;

wherein each of the at least three regions has a different number of the shredding tools;

wherein a larger number of the shredding tools in the plurality of shredding tools is provided in the first region than in the middle and further regions; and wherein a larger number of the shredding tools in the plurality of shredding tools is provided in the middle region than in the further region.

* * * * *